US010138787B2

United States Patent
Yamamoto et al.

(10) Patent No.: US 10,138,787 B2
(45) Date of Patent: Nov. 27, 2018

(54) TREATMENT DEVICE EQUIPPED WITH CATALYST-SUPPORTING HONEYCOMB STRUCTURE, AND METHOD FOR PRODUCING SAME

(71) Applicant: Hitachi Zosen Corporation, Osaka-shi (JP)

(72) Inventors: Seigo Yamamoto, Osaka (JP); Susumu Hikazudani, Osaka (JP); Naoe Hino, Osaka (JP); Fumiya Tubo, Osaka (JP); Tetsuo Kodama, Osaka (JP); Shunsuke Hiraiwa, Osaka (JP); Ryoichi Koumaru, Osaka (JP)

(73) Assignee: Hitachi Zosen Corporation, Osaka-shi (JP)

( * ) Notice: Subject to any disclaimer, the term of this patent is extended or adjusted under 35 U.S.C. 154(b) by 476 days.

(21) Appl. No.: 14/652,875

(22) PCT Filed: Sep. 24, 2013

(86) PCT No.: PCT/JP2013/075661
§ 371 (c)(1),
(2) Date: Jun. 17, 2015

(87) PCT Pub. No.: WO2014/097700
PCT Pub. Date: Jun. 26, 2014

(65) Prior Publication Data
US 2015/0330280 A1    Nov. 19, 2015

(30) Foreign Application Priority Data

Dec. 17, 2012 (JP) ................................ 2012-274299

(51) Int. Cl.
*B01D 53/88* (2006.01)
*F01N 3/20* (2006.01)
(Continued)

(52) U.S. Cl.
CPC ............ *F01N 3/28* (2013.01); *B01D 46/2418* (2013.01); *B01D 53/885* (2013.01); *B01J 23/22* (2013.01);
(Continued)

(58) Field of Classification Search
None
See application file for complete search history.

(56) References Cited

U.S. PATENT DOCUMENTS 6,025,298 A * 2/2000 Imoto ................ B01D 53/8628
502/240
2006/0182669 A1 * 8/2006 Matumura ......... B01D 53/8675
422/177

(Continued)

FOREIGN PATENT DOCUMENTS

EP      1099834 A2    5/2001
JP      59-073053 A   4/1984
(Continued)

OTHER PUBLICATIONS

Office Action drafted Dec. 4, 2015, issued for the corresponding Japanese patent application No. 2012-274299.
(Continued)

*Primary Examiner* — Colin W. Slifka
(74) *Attorney, Agent, or Firm* — Locke Lord LLP; James E. Armstrong, IV; Nicholas J. DiCeglie, Jr.

(57) ABSTRACT

To provide a treatment device equipped with a catalyst-supporting honeycomb structure, the device being for use in, for example, an exhaust gas purification treatment, hydrogen production by ammonia decomposition or the like, and a method for producing the same. The catalyst-supporting honeycomb structure is produced by forming the inorganic binder-containing functional catalyst-supporting corrugated glass paper without removing an organic binder originally
(Continued)

contained in the glass paper and by using the corrugated glass paper in combination with the inorganic binder-containing functional catalyst-supporting flat glass paper. In the treatment device equipped with a catalyst-supporting honeycomb structure, a corrugated glass paper having an inorganic binder-containing functional catalyst supported thereon and a flat glass paper having the same inorganic binder-containing functional catalyst supported thereon are alternately stacked to form the catalyst-supporting honeycomb structure, and this catalyst-supporting honeycomb structure is packed in a casing.

9 Claims, 2 Drawing Sheets

(51) Int. Cl.
*F01N 3/28* (2006.01)
*B01D 46/24* (2006.01)
*B01J 23/22* (2006.01)
*B01J 35/04* (2006.01)
*B01J 37/02* (2006.01)
*C04B 38/00* (2006.01)
*C04B 111/00* (2006.01)

(52) U.S. Cl.
CPC ........... *B01J 35/04* (2013.01); *B01J 37/0234* (2013.01); *C04B 38/0006* (2013.01); *F01N 3/2066* (2013.01); *C04B 2111/0081* (2013.01); *F01N 2310/02* (2013.01); *F01N 2330/101* (2013.01); *Y02T 10/24* (2013.01); *Y10T 29/49346* (2015.01)

(56) References Cited

U.S. PATENT DOCUMENTS

| | | |
|---|---|---|
| 2007/0289275 A1 | 12/2007 | Ohno et al. |
| 2011/0262691 A1 | 10/2011 | Naruse et al. |
| 2015/0037222 A1 | 2/2015 | Hikazudani et al. |

FOREIGN PATENT DOCUMENTS

| | | |
|---|---|---|
| JP | 33-052647 A | 3/1991 |
| JP | 03-275146 A | 12/1991 |
| JP | 05-154350 A | 6/1993 |
| JP | 2002-119868 A | 4/2002 |
| JP | 2003-172134 A | 6/2003 |
| JP | 2010-013773 A | 1/2010 |
| JP | 2013-169524 A | 9/2013 |
| WO | WO-2006/092986 A1 | 9/2006 |
| WO | WO-2013/125127 A1 | 8/2013 |

OTHER PUBLICATIONS

Official Letter dated Apr. 29, 2016, issued for the corresponding Chinese patent application No. 201380065946.X.
Supplementary European Search Report dated Jul. 15, 2016, issued for the corresponding European patent application No. 13864890.2.
International Search Report dated Dec. 3, 2013, issued for PCT/JP2013/075661.
U.S. Appl. No. 16/037,398 and Preliminary Amendment filed Jul. 17, 2018.

* cited by examiner

TREATMENT DEVICE EQUIPPED WITH CATALYST-SUPPORTING HONEYCOMB STRUCTURE, AND METHOD FOR PRODUCING SAME

TECHNICAL FIELD

The present invention relates to a treatment device equipped with a catalyst-supporting honeycomb structure used for, for example, an exhaust gas purification treatment, hydrogen production by ammonia decomposition or the like, and a method for producing the same.

BACKGROUND ART

It has conventionally been difficult to use a commercially available glass paper as a substrate for a honeycomb structure (flat sheets+corrugated sheets) in a treatment device equipped with a catalyst-supporting honeycomb structure used for exhaust gas purification treatment or the like.

For example, when trying to mold a commercially available glass paper into a corrugated shape using a corrugation molding machine (corrugator), the paper returns to an original shape even if pressure is applied to a flat glass paper to bend the glass paper, because of a large resilience due to an organic binder contained in the glass paper. Since the glass paper tears when an excessive pressure is applied, a large pressure cannot be applied, and thus there has been a restriction on the type of the glass paper capable of being applied for corrugation processing (see Patent Literature 1 listed below).

Further, up to now, in production of a catalyst-supporting honeycomb structure, tangential portions of the honeycomb structure, i.e., portions where tops of a corrugated sheet contact with a flat sheet have been bonded through an adhesive, and any other means has not been used to hold the honeycomb structure.

In addition, in existing production of an exhaust gas purification treatment device or the like including a honeycomb structure as a substrate, in order to allow the honeycomb structure to support a functional catalyst thereon, a method in which the honeycomb structure itself is immersed in a catalyst-containing solution or slurry has been adopted.

Furthermore, in this honeycomb structure which is formed by alternately stacking and bonding flat sheets and corrugated sheets, for example, in cases where solids are contained in gas to be treated in an exhaust gas purification treatment or the like, a phenomenon that cells (gap portions) of the honeycomb structure are clogged with the solids as the operating time elapses is observed. Since the gas to be treated is not contact with inner walls of the cells having the solids clogged therein, the contact area of the gas to be treated decreases. In addition, the pressure loss also increases. Accordingly, when clogging of a certain level or more occurs by an exhaust gas purification treatment or the like, it is required to exchange the honeycomb structure or to perform a regeneration treatment to solve the clogging.

The regeneration treatment to solve such clogging of a honeycomb structure has heretofore been performed by a method of pushing the clogging portions with a rod or the like.

PRIOR ART LITERATURE

Patent Literature

PTL 1: JP-A-2010-013773

SUMMARY OF INVENTION

Technical Problem

However, according to the conventional method as described in PTL 1 mentioned above, in order to allow a honeycomb structure to support a catalyst thereon, the honeycomb structure itself is immersed in a catalyst-containing solution or slurry and dried. Large facilities are thus required as an immersion tank and a drying apparatus for the honeycomb structure, and accordingly, there has been a problem of a high production cost of the honeycomb structure.

In addition, according to the conventional method, a regeneration treatment to solve clogging of cells of honeycomb structure with solids in gas to be treated, for example, in an exhaust gas purification treatment or the like, is conducted by a method of pushing clogging portions with a rod or the like. Accordingly, in a case of a honeycomb structure having a poor mechanical strength, there is a problem of cell portions being damaged by such a regeneration treatment.

Then, the present applicant previously proposed an invention of a treatment device equipped with a catalyst-supporting honeycomb structure that uses a commercially available inexpensive glass paper as a substrate and further can solve the above-mentioned problem in the prior art, and a method for producing the same.

The previously-proposed method for producing a treatment device equipped with a catalyst-supporting honeycomb structure was a method comprising, baking a glass paper to remove an organic binder component contained in the glass paper by combustion, then applying a functional catalyst-containing slurry on the glass paper, shaping the functional catalyst-containing slurry-applied glass paper with a corrugation mold and a presser jig, and further drying and calcinating the glass paper, thereby forming a functional catalyst-supporting corrugated glass paper; meanwhile drying and calcinating the flat shape of functional catalyst slurry-applied glass paper after the organic binder component is combustion-removed by baking, thereby forming a functional catalyst-supporting flat glass paper; and alternately stacking the functional catalyst-supporting corrugated glass paper and the functional catalyst-supporting flat glass paper, thereby producing a catalyst-supporting honeycomb structure.

However, in the previously-proposed invention of a method for producing a treatment device equipped with a catalyst-supporting honeycomb structure, since the organic binder is removed by baking the glass paper, there newly arose a problem as follows. That is, when the baking temperature is too high or the baking time is too long, the organic binder is excessively removed, the corrugated shape of the glass paper is not held, and the paper is difficult to handle in subsequent processes. Conversely, when the baking temperature of the glass paper is too low or the baking time is too short, the organic binder is not removed, resilience of the glass paper is high, and thus the corrugation is difficult.

An object of the present invention is to provide a treatment device equipped with a catalyst-supporting honeycomb structure in which the problem in the prior art and the problem in the previously-proposed invention are solved, and a production method thereof.

Solution to Problem

As a result of intensive studies in view of the above problems, the present inventors found that, by using an inorganic binder in order to hold a shape of the glass paper without removing an organic binder originally contained in a glass paper, applying a functional catalyst-containing slurry having the inorganic binder mixed therein on a flat glass paper, and then placing the inorganic binder-mixed functional catalyst-containing slurry-applied glass paper on a corrugation mold previously heated to a high temperature and shaping the glass paper with a presser jig, moisture in the functional catalyst-containing slurry is immediately removed and a corrugated shape is held by the action of the inorganic binder, whereby an inorganic binder-containing functional catalyst-supporting corrugated glass paper can be formed, and by combining this inorganic binder-containing functional catalyst-supporting corrugated glass paper with an inorganic binder-containing functional catalyst-supporting flat glass paper, a catalyst-supporting honeycomb structure can be produced, and that accordingly a production process of a treatment device equipped with a catalyst-supporting honeycomb structure can be significantly shortened and also the production cost can be greatly reduced, thus achieving the completion of the present invention.

In order to achieve the foregoing object, the invention of claim 1 is characterized in that a corrugated glass paper having an inorganic binder-containing functional catalyst supported thereon and a flat glass paper having the same inorganic binder-containing functional catalyst supported thereon are alternately stacked to form a catalyst-supporting honeycomb structure, and this catalyst-supporting honeycomb structure is packed in a casing.

The invention of claim 2 is directed to the treatment device equipped with a catalyst-supporting honeycomb structure according to claim 1, characterized in that the corrugated glass paper having the inorganic binder-containing functional catalyst supported thereon and the flat glass paper having the same inorganic binder-containing functional catalyst supported thereon are alternately stacked without being bonded.

The invention of claim 3 is directed to the treatment device equipped with a catalyst-supporting honeycomb structure according to claim 1 or 2, characterized in that the functional catalyst is a catalyst selected from the group consisting of a denitrification catalyst, a desulfurization catalyst, a dioxins decomposition catalyst, and an ammonia decomposition catalyst, and is used for an exhaust gas purification treatment or hydrogen production by ammonia decomposition.

The invention of claim 4 is directed to the treatment device equipped with a catalyst-supporting honeycomb structure according to any one of claims 1 to 3, characterized in that the inorganic binder contains at least one inorganic oxide selected from the group consisting of a silica sol, an alumina sol, a γ-alumina, a titanium oxide sol, and a zirconia sol.

The invention of claim 5 is directed to the treatment device equipped with a catalyst-supporting honeycomb structure according to any one of claims 1 to 4, characterized in that the casing has a shape of square tube, and is one including a casing having a substantially square shape cross section, one including a casing main body having a substantially U-shape cross section and a flat lid which covers the opening of the casing main body, or one including a casing main body having a substantially L-shape cross section and a lid having a substantially laid L-shape cross section which fits with the casing main body.

The invention of claim 6 is directed to the treatment device equipped with a catalyst-supporting honeycomb structure according to any one of claims 1 to 5, characterized in that an inorganic fiber blanket is placed over the inner surface of the casing.

The invention of claim 7 is directed to a method for producing a treatment device equipped with a catalyst-supporting honeycomb structure, characterized by comprising the steps of: applying a functional catalyst-containing slurry having an inorganic binder mixed therein on a flat glass paper; placing and heating the slurry-applied flat glass paper on a corrugation mold of a high temperature, while shaping the glass paper with a presser jig and removing moisture in the slurry on the surface of the glass paper to dry the glass paper, thereby forming an inorganic binder-containing functional catalyst-supporting corrugated glass paper; releasing the inorganic binder-containing functional catalyst-supporting corrugated glass paper from the corrugation mold while holding the shape; meanwhile placing and heating the slurry-applied flat glass paper on a flat mold of a high temperature to remove moisture in the slurry on the surface of the glass paper and dry the glass paper, thereby forming an inorganic binder-containing functional catalyst-supporting flat glass paper; releasing the inorganic binder-containing functional catalyst-supporting flat glass paper from the flat mold while holding the shape; and alternately stacking the inorganic binder-containing functional catalyst-supporting corrugated glass paper and the inorganic binder-containing functional catalyst-supporting flat glass paper and packing the stack in a casing.

The invention of claim 8 is directed to the method for producing a treatment device equipped with a catalyst-supporting honeycomb structure according to claim 7, characterized in that the surface temperatures of the corrugation mold and the flat mold are within the range of from 200 to 500° C.

The invention of claim 9 is directed to the method for producing a treatment device equipped with a catalyst-supporting honeycomb structure according to claim 7 or 8, characterized in that the inorganic binder contains at least one inorganic oxide selected from the group consisting of a silica sol, an alumina sol, a γ-alumina, a titanium oxide sol, and a zirconia sol.

The invention of claim 10 is directed to the method for producing a treatment device equipped with a catalyst-supporting honeycomb structure according to any one of claims 7 to 9, characterized by further comprising the step of: baking the inorganic binder-containing functional catalyst-supporting corrugated glass paper and the inorganic binder-containing functional catalyst-supporting flat glass paper released from the respective molds to thermally decompose and remove an organic binder originally contained in the glass papers, while holding the shapes of the glass papers by the inorganic binder, to thereby form an inorganic binder-containing functional catalyst-supporting corrugated glass paper and an inorganic binder-containing functional catalyst-supporting flat glass paper.

The invention of claim 11 is directed to the method for producing a treatment device equipped with a catalyst-supporting honeycomb structure according to any one of claims 7 to 10, characterized in that, in the step of packing into the casing, the inorganic binder-containing functional catalyst-supporting corrugated glass paper and the inorganic binder-containing functional catalyst-supporting flat glass paper are alternately stacked without being bonded to each other.

Advantageous Effects of Invention

According to the invention of a treatment device equipped with a catalyst-supporting honeycomb structure set forth in claim 1, by using an inorganic binder in order to hold a shape of the glass paper without removing an organic binder originally contained in a glass paper, and by holding a corrugated shape by the action of the inorganic binder, an inorganic binder-containing functional catalyst-supporting corrugated glass paper can be formed, and by combining this inorganic binder-containing functional catalyst-supporting corrugated glass paper with an inorganic binder-containing functional catalyst-supporting flat glass paper, a catalyst-supporting honeycomb structure can be produced. Accordingly, an effect of not only being capable of significantly shortening a production process of a treatment device equipped with a catalyst-supporting honeycomb structure but also greatly reducing the production cost is brought about.

Furthermore, large facilities such as an immersion tank, a drying apparatus or the like for the honeycomb structure in the prior art are not required, and an effect of further reducing the production cost is brought about.

According to the invention set forth in claim 2, the following effects are brought about. That is, an inexpensive catalyst-supporting honeycomb structure obtained by using a glass paper as a substrate can be stably held, and a casing can be released to solve clogging of cells of the catalyst-supporting honeycomb structure with solids in gas to be treated in an exhaust gas purification treatment or the like.

According to the invention set forth in claim 3, the following effect is brought about. That is, an inexpensive catalyst-supporting honeycomb structure obtained by using a glass paper as a substrate can be used for an exhaust gas purification treatment and hydrogen production by ammonia decomposition.

According to the invention set forth in claim 4, the following effect is brought about. That is, by using an inorganic binder containing at least one inorganic oxide selected from the group consisting of a silica sol, an alumina sol, a γ-alumina, a titanium oxide sol, and a zirconia sol, the shape of the glass paper can be securely held.

According to the invention set forth in claim 5, the following effect is brought about. That is, an inexpensive catalyst-supporting honeycomb structure obtained by using a glass paper as a substrate can be stably held, and in an exhaust gas purification treatment or the like, the casing can be released to solve clogging of cells of the catalyst-supporting honeycomb structure with solids in gas to be treated.

According to the invention set forth in claim 6, the following effect is brought about. That is, a vibration measure can be implemented by a friction force between the catalyst-supporting honeycomb structure and the inorganic fiber blanket.

According to the invention of the method for producing a treatment device equipped with a catalyst-supporting honeycomb structure set forth in claim 7, by using an inorganic binder to hold a shape of the glass paper without removing an organic binder originally contained in a glass paper, applying a functional catalyst-containing slurry containing the inorganic binder onto the glass paper, and then placing the inorganic binder-containing slurry-applied glass paper on a previously heated corrugation mold and shaping the glass paper with a presser jig, thereby immediately removing moisture in the functional catalyst-containing slurry, while holding the corrugated shape by the action of the inorganic binder, an inorganic binder-containing functional catalyst-supporting corrugated glass paper can be formed, and by combining this inorganic binder-containing functional catalyst-supporting corrugated glass paper with the inorganic binder-containing functional catalyst-supporting flat glass paper, a catalyst-supporting honeycomb structure can be produced, whereby the following effect is brought about. That is, a production process of a treatment device equipped with a catalyst-supporting honeycomb structure can be significantly shortened and in addition, the production cost can be greatly reduced.

Furthermore, the following effects are brought about. That is, large facilities such as an immersion tank, a drying apparatus or the like for the honeycomb structure in the prior art are not required, and therefore the production cost can be reduced, and even when cells of the catalyst-supporting honeycomb structure are clogged with solids in gas to be treated as the operating time elapses, for example, in an exhaust gas purification treatment or the like, the catalyst-supporting honeycomb structure can be easily treated for regeneration, and thus a decrease of the contact area of the gas to be treated and an increase of the pressure loss can be prevented.

According to the invention set forth in claim 8, the following effect is brought about. That is, a glass paper can be shaped on a mold, while removing moisture in the slurry on the surface of the glass paper and drying the glass paper, whereby each of an inorganic binder-containing functional catalyst-supporting corrugated glass paper and an inorganic binder-containing functional catalyst-supporting flat glass paper can be formed. Incidentally, when the surface temperature of the mold exceeds 500° C., the activity of the functional catalyst such as a denitrification catalyst is reduced, so such a temperature is not preferred.

According to the invention set forth in claim 9, the following effect is brought about. That is, by using an inorganic binder containing at least one inorganic oxide selected from the group consisting of a silica sol, an alumina sol, a γ-alumina, a titanium oxide sol, and a zirconia sol, a shape of the glass paper can be securely held.

According to the invention set forth in claim 10, the following effect is brought about. That is, by thermally decomposing and removing in advance an organic binder originally contained in a glass paper by baking, a shape of the glass paper is securely held by the inorganic binder, whereby an inorganic binder-containing functional catalyst-supporting corrugated glass paper and an inorganic binder-containing functional catalyst-supporting flat glass paper can be securely formed.

Incidentally, in the invention set forth in claim 7, in a state where an organic binder originally contained in the glass paper is present, a functional catalyst-containing slurry having an inorganic binder mixed therein is applied on a flat glass paper and the flat glass paper is shaped, whereby an inorganic binder-containing functional catalyst-supporting corrugated glass paper and an inorganic binder-containing functional catalyst-supporting flat glass paper are formed, and they are alternately stacked. In this case, however, for example, when the treatment device equipped with the catalyst-supporting honeycomb structure produced is incorporated in a denitrification apparatus and denitrification of exhaust gas is performed at a temperature of 250 to 400° C., the organic binder originally contained in the glass paper is thermally decomposed gradually and removed, and naturally, the corrugated shape of the glass paper is, also in this case, held by the inorganic binder, so there is no problem.

According to the invention set forth in claim 11, the following effect is brought about. That is, for example, in an exhaust gas purification treatment or the like, even if cells of the catalyst-supporting honeycomb structure are clogged with solids in gas to be treated as the operating time elapses, since an inorganic binder-containing functional catalyst-supporting corrugated glass paper and an inorganic binder-containing functional catalyst-supporting flat glass paper are alternately stacked without being bonded to form a catalyst-supporting honeycomb structure, and the catalyst-supporting honeycomb structure is packed in a casing, the catalyst-supporting honeycomb structure can be disassembled and removed out of the casing, the removed catalyst-supporting corrugated glass paper and catalyst-supporting flat glass paper can be easily treated for regeneration, for example, by cleaning the glass papers, whereby a decrease of the contact area of gas to be treated and an increase of the pressure loss can be securely prevented.

EXPLANATIONS OF REFERENCE NUMERALS

1: Catalyst-supporting honeycomb structure
2: Inorganic binder-containing functional catalyst-supporting corrugated glass paper
3: Inorganic binder-containing functional catalyst-supporting flat glass paper
4: Casing
4a: Casing main body
4b: Lid
5: Blanket
10: Treatment device equipped with catalyst-supporting honeycomb structure

DESCRIPTION OF EMBODIMENTS

Next, an embodiment of the present invention will be described with reference to the drawings, but the present invention is not to be limited thereto.

Figure 1:
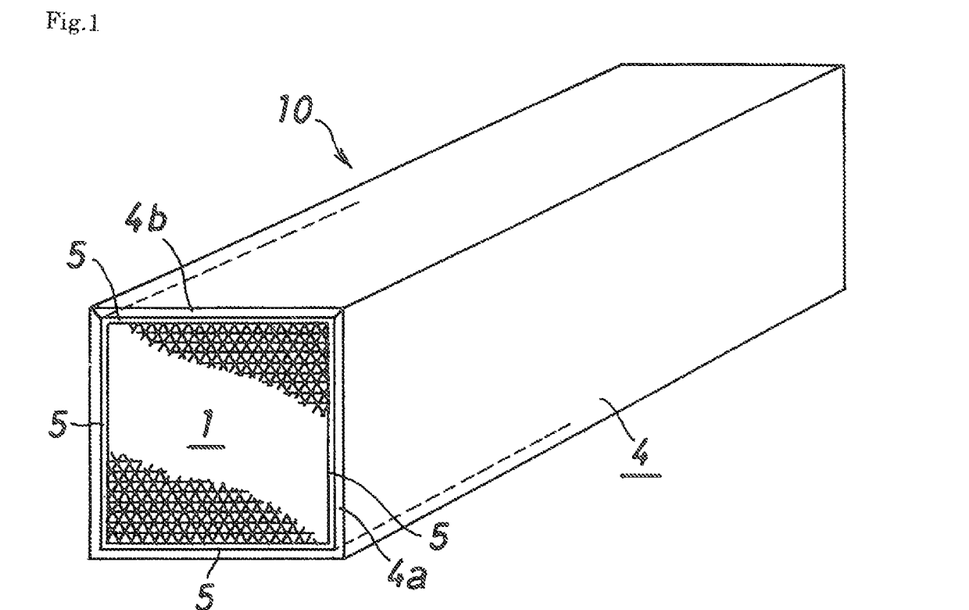
FIG. 1 is a perspective view showing an embodiment of a treatment device equipped with a catalyst-supporting honeycomb structure of the present invention.
Figure 2:
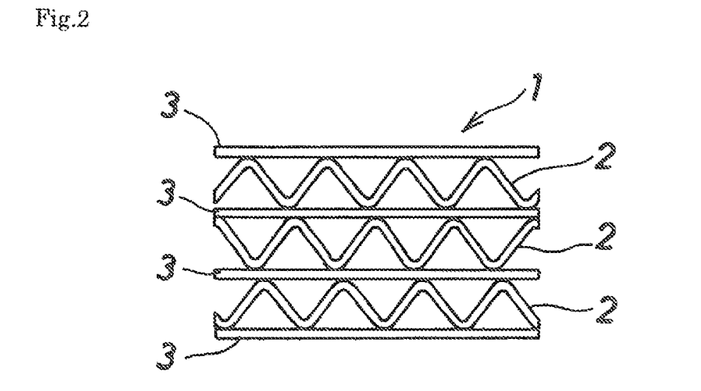
FIG. 2 is an essential part-enlarged front view of a catalyst-supporting honeycomb structure portion of the treatment device of FIG. 1.

FIG. 1 is a perspective view showing an embodiment of a treatment device equipped with a catalyst-supporting honeycomb structure of the present invention. FIG. 2 is an essential part-enlarged front view of a catalyst-supporting honeycomb structure portion of the treatment device of FIG. 1.

Referring to FIGS. 1 and 2, a treatment device (10) equipped with a catalyst-supporting honeycomb structure according to the present invention is characterized in that a corrugated glass paper (2) having an inorganic binder-containing functional catalyst supported thereon and a flat glass paper (3) having the same inorganic binder-containing functional catalyst supported thereon are alternately stacked, whereby a catalyst-supporting honeycomb structure (1) is formed, and the catalyst-supporting honeycomb structure (1) is packed in a casing (4).

The present inventors found that, by using an inorganic binder in order to hold a shape of the glass paper without removing an organic binder originally contained in a glass paper, applying a functional catalyst-containing slurry having the inorganic binder mixed therein on a flat glass paper, and then placing the inorganic binder-mixed functional catalyst-containing slurry-applied glass paper on a corrugation mold previously heated and shaping the glass paper with a presser jig, moisture in the functional catalyst-containing slurry is immediately removed and a corrugated shape is held by the action of the inorganic binder, whereby the inorganic binder-containing functional catalyst-supporting corrugated glass paper (2) can be formed, and by combining this inorganic binder-containing functional catalyst-supporting corrugated glass paper (2) with the inorganic binder-containing functional catalyst-supporting flat glass paper (3), the catalyst-supporting honeycomb structure (1) can be produced; and that accordingly a production process of the treatment device equipped with the catalyst-supporting honeycomb structure (1) can be significantly shortened and the production cost can also be greatly reduced.

In the treatment device (10) equipped with a catalyst-supporting honeycomb structure of the present invention, preferably, the functional catalyst is a catalyst selected from the group consisting of a denitrification catalyst, a desulfurization catalyst, a dioxins decomposition catalyst, and an ammonia decomposition catalyst, and can be used for an exhaust gas purification treatment or hydrogen production by ammonia decomposition. Incidentally, as the denitrification catalyst, a catalyst containing vanadium is preferably used, and as the ammonia decomposition catalyst, a catalyst containing ruthenium is preferably used.

Further, in the treatment device equipped with a catalyst-supporting honeycomb structure according to the present invention, the inorganic binder preferably contains at least one inorganic oxide selected from the group consisting of a silica sol, an alumina sol, a γ-alumina, a titanium oxide sol, and a zirconia sol.

By using such an inorganic binder, a shape of the glass paper can securely be held.

According to the present invention, an inorganic binder is used in order to hold a shape of the glass paper without removing an organic binder originally contained in the glass paper. Since a corrugated shape is held by the action of the inorganic binder, the inorganic binder-containing functional catalyst-supporting corrugated glass paper (2) can be formed. By combining this inorganic binder-containing functional catalyst-supporting corrugated glass paper (2) with the inorganic binder-containing functional catalyst-supporting flat glass paper (3), the catalyst-supporting honeycomb structure (1) can be produced. Accordingly, a production process of the treatment device (10) equipped with the catalyst-supporting structure (1) can be significantly shortened and the production cost can be greatly reduced.

Further, large facilities such as an immersion tank, drying apparatus or the like for the honeycomb structure in the prior art are not required and the production cost is further reduced.

In the treatment device equipped with a catalyst-supporting honeycomb structure according to the present invention, it is preferred that the corrugated glass paper (2) having an inorganic binder-containing functional catalyst supported thereon and the flat glass paper (3) having the same inorganic binder-containing functional catalyst supported thereon are alternately stacked without being bonded.

As described above, the inorganic binder-containing functional catalyst-supporting corrugated glass paper (2) and the inorganic binder-containing functional catalyst-supporting flat glass paper (3) which utilize a glass paper are stacked without bonding with an adhesive which is used in the prior art, and thus the catalyst-supporting honeycomb structure (1) can be produced. According to the treatment device (10)

of the present invention in which the catalyst-supporting honeycomb structure (1) is packed in a casing, large facilities such as an immersion tank, a drying apparatus or the like for a so-called bonding-type honeycomb structure in the prior art are not required and therefore the production cost is reduced.

In addition, for example, in an exhaust gas purification treatment or the like, even if cells of the catalyst-supporting honeycomb structure (1) are clogged with solids in gas to be treated as the operating time elapses, since the inorganic binder-containing functional catalyst-supporting corrugated glass paper (2) and the inorganic binder-containing functional catalyst-supporting flat glass paper (3) are alternately stacked without being bonded to form the catalyst-supporting honeycomb structure (1) and the catalyst-supporting honeycomb structure (1) is packed in the casing (4), the catalyst-supporting honeycomb structure (1) can be disassembled and removed out of the casing (4), the removed inorganic binder-containing functional catalyst-supporting corrugated glass paper (2) and inorganic binder-containing functional catalyst-supporting flat glass paper (3) can be easily treated for regeneration, for example, by cleaning the glass papers, whereby a decrease of the contact area of gas to be treated and an increase of the pressure loss can be securely prevented.

In the treatment device (10) equipped with a catalyst-supporting honeycomb structure according to the present invention, the casing (4) preferably has a shape of a square tube. The casing (4) here is preferably a casing including a casing main body (4a) having a substantially U-shape cross section and a flat lid (4b) which covers the opening of the casing main body.

Although the drawing is omitted, the casing (4) is preferably a casing having a substantially square shape cross section, or a casing including a casing main body having a substantially L-shape cross section and a lid having a substantially laid L-shape cross section which fits with the casing main body.

Incidentally, the casing (4) is not limited to one having a square tube shape, and may be of a cylindrical shape. A casing of a square tube shape is however more preferred in packing the catalyst-supporting honeycomb structure (1) in which the inorganic binder-containing functional catalyst-supporting flat glass paper (3) and the inorganic binder-containing functional catalyst-supporting corrugated glass paper (2) are alternately stacked in the casing (4).

In the treatment device (10) equipped with a catalyst-supporting honeycomb structure according to the present invention, it is preferred that an inorganic fiber blanket (5) is placed over the inner surface of the casing (4). A vibration measure can be implemented by a friction force between the catalyst-supporting honeycomb structure (1) and the inorganic fiber blanket (5) on the inner surface of the casing (4).

Examples of the inorganic fiber which is a material of the blanket (5) include a ceramic fiber, a glass fiber, a silica sol fiber, an alumina fiber, and a rock wool.

Here, when a place where the treatment device (10) equipped with a catalyst-supporting honeycomb structure according to the present invention is arranged exhibits a strong vibration, the inorganic fiber blanket (5) may be placed over the inner surface of the casing (4), and when any vibration measure is not particularly required, the inorganic fiber blanket (5) may not be placed.

Next, the method of producing the treatment device equipped with a catalyst-supporting honeycomb structure of the present invention will be explained.

When heretofore trying to mold a commercially available glass paper into a corrugated shape, for example, using a corrugation molding machine (corrugator), because of a large resilience due to an organic binder contained in the glass paper, the glass paper returns to an original shape even if a pressure is applied to a flat glass paper to bend it. When an excessive pressure is applied, the glass paper tears, and therefore a large pressure cannot be applied.

In order to solve the existing problem as above, it is considered to be possible that, by applying a functional catalyst-containing slurry having an inorganic binder mixed therein onto a commercially available glass paper still containing an organic binder, and placing the glass paper on a mold which is previously heated using an electric heater to perform corrugation and immediately evaporate moisture in the slurry, the corrugated shape can be held by the binder action of the inorganic binder in the slurry. Thus, a study of a method for producing catalyst using a commercially available glass paper in which an organic binder remains without removed is conducted, and as a result, it was found that the production is possible by using the following method.

Figure 3:
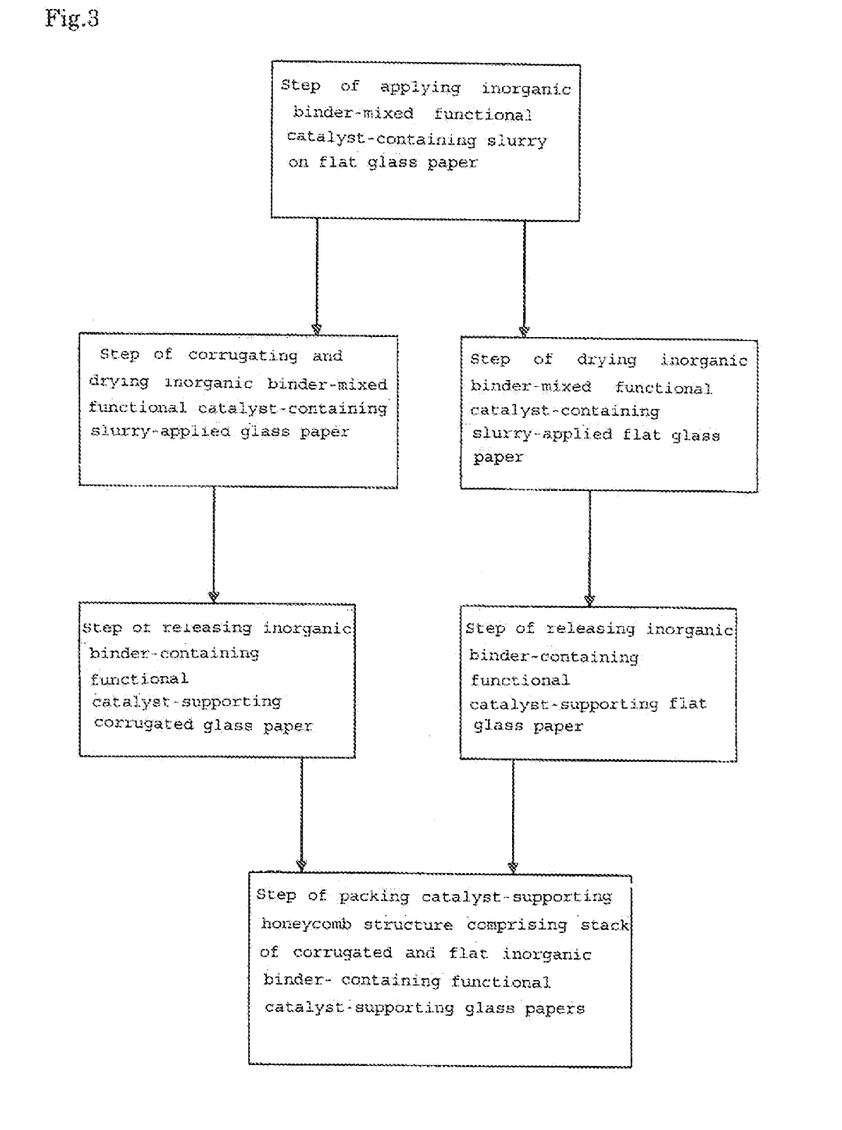
FIG. 3 is a block diagram showing a method for producing a treatment device equipped with a catalyst-supporting honeycomb structure of the present invention in order of the steps.

FIG. 3 is a flow sheet showing the method for producing a treatment device equipped with a catalyst-supporting honeycomb structure of the present invention in order of the steps.

Referring to the drawing, the method for producing the treatment device (10) equipped with the catalyst-supporting honeycomb structure (1) according to the present invention comprises the steps of: applying a functional catalyst-containing slurry having an inorganic binder mixed therein on a flat glass paper; placing and heating the slurry-applied flat glass paper on a corrugation mold of a high temperature, while shaping the glass paper with a presser jig and removing moisture in the slurry on the surface of the glass paper to dry the glass paper, thereby forming the inorganic binder-containing functional catalyst-supporting corrugated glass paper (2); releasing the inorganic binder-containing functional catalyst-supporting corrugated glass paper (2) from the corrugation mold while holding the shape; meanwhile placing and heating the slurry-applied flat glass paper on a flat mold of a high temperature and thus removing moisture in the slurry on the surface of the glass paper to dry the glass paper, thereby forming the inorganic binder-containing functional catalyst-supporting flat glass paper (3); releasing the inorganic binder-containing functional catalyst-supporting flat glass paper (3) from the flat mold while holding the shape; alternately stacking the inorganic binder-containing functional catalyst-supporting corrugated glass paper (2) and the inorganic binder-containing functional catalyst-supporting flat glass paper (3) and packing the stack in the casing (4).

The glass paper used in the present invention is a commercially available glass paper containing an organic binder. Incidentally, examples of the organic binder used in the commercially available glass paper include an acrylic resin, a polyvinyl alcohol (PVA)-polyvinyl acetate copolymer, an unsaturated polyester resin, an epoxy resin, etc.

Here, in the method for producing the treatment device (10) equipped with a catalyst-supporting honeycomb structure according to the present invention, in a state where the organic binder originally contained in the glass paper is present, the functional catalyst-containing slurry having the inorganic binder mixed therein is applied on the flat glass paper and the glass paper is shaped to form the inorganic binder-containing functional catalyst-supporting corrugated glass paper (2) and the inorganic binder-containing functional catalyst-supporting flat glass paper (3), and they are alternately stacked, whereby the catalyst-supporting honeycomb structure (1) is produced. In this case, however, when a treatment device equipped with the catalyst-supporting honeycomb structure (1) produced is incorporated in a denitrification apparatus and denitrification of exhaust gas is performed, for example, at a temperature of 250 to 400° C., the organic binder originally contained in the glass paper is thermally decomposed gradually and removed, and naturally, the corrugated or flat shape of the glass paper is, also in this case, held by the inorganic binder, so there is no problem.

In the step of shaping the functional catalyst slurry-applied glass paper into a corrugated shape in the method for producing the treatment device (10) equipped with a catalyst-supporting honeycomb structure of the present invention, it is preferred that using a mold formed of a metal panel which has parallel recessed grooves having a width of 5 to 15 mm, a height of 2 to 10 mm, and a radius of curvature at the groove bottom of 0.5 to 2 mm, the functional catalyst slurry-applied glass paper placed on the mold is pressed along the recessed grooves with a presser jig to shape the glass paper.

The presser jig has a water repellent finishing or a Teflon (registered trademark) coating applied thereon in a portion which is brought into contact with the glass paper. If the recessed grooves of the corrugated mold to be pressed under the glass paper do not have a shape having a radius of curvature of approximately from 0.5 to 2 mm, the press cannot be achieved, and when the radius of curvature is further smaller, the glass paper tears, so such cases are not preferred.

In the method for producing the treatment device (10) equipped with a catalyst-supporting honeycomb structure of the present invention, the corrugated shape of inorganic binder-containing functional catalyst-supporting glass paper (2) released from the corrugation mold and the flat shape of inorganic binder-containing functional catalyst-supporting glass paper (3) released from the flat mold have substantially the same size viewed in the plain surface.

In the method for producing the treatment device (10) equipped with a catalyst-supporting honeycomb structure according to the present invention, the surface temperatures of the corrugation mold and the flat mold are preferably in the range of from 200 to 500° C.

Here, when the surface temperature of the molds is lower than 200° C., the time required for drying and releasing the inorganic binder-mixed functional catalyst-containing slurry-applied glass paper becomes long and such a case is not practical. On the other hand, when the surface temperature of the molds is a high temperature exceeding 500° C., not only a strain could be caused in the mold, but also the activity of the functional catalyst such as a denitrification catalyst may be reduced, and therefore such a temperature is not preferred. Incidentally, a desirable mold surface temperature as a condition for releasing the inorganic binder-mixed functional catalyst-containing slurry-applied glass paper from the mold immediately after the corrugation is 300° C. or higher. The mold surface temperature was measured by means of a non-contact radiation thermometer.

Thus, it is possible to shape the glass paper on the mold, remove moisture in the slurry on the surface of the glass paper and dry the glass paper, whereby each of the inorganic binder-containing functional catalyst-supporting corrugated glass paper (2) and the inorganic binder-containing functional catalyst-supporting flat glass paper (3) can be formed without a reduction of the activity of the functional catalyst such as a denitrification catalyst.

The inorganic binder-containing functional catalyst-supporting corrugated glass paper (2) and the inorganic binder-containing functional catalyst-supporting flat glass paper (3) which have been shaped and dried on the molds as described above can be easily released from the molds.

In the method for producing the treatment device (10) equipped with a catalyst-supporting honeycomb structure according to the present invention, as the inorganic binder, an inorganic binder containing at least one inorganic oxide selected from the group consisting of a silica sol, an alumina sol, a γ-alumina, a titanium oxide sol, and a zirconia sol is used. By using such an inorganic binder, the shape of the glass paper can be securely held.

In the method for producing the treatment device (10) equipped with a catalyst-supporting honeycomb structure of the present invention, in the step of applying the functional catalyst-containing slurry having the inorganic binder mixed therein on the flat glass paper, the content of the inorganic binder in the inorganic binder-mixed functional catalyst-containing slurry to be applied on the flat glass paper is 10 to 30% by weight; it is preferably 5 to 25% by weight. When the content of the inorganic binder falls within the above range, the mechanical structure and the catalyst performance can be stably exhibited, and in addition, the glass paper shaped by the action of the inorganic binder can hold its corrugated shape to thereby form the inorganic binder-containing functional catalyst-supporting corrugated glass paper (2), and by combining this inorganic binder-containing functional catalyst-supporting corrugated glass paper (2) with the inorganic binder-containing functional catalyst-supporting flat glass paper (3), the catalyst-supporting honeycomb structure (1) can be produced. Accordingly such a content is preferred, but the content is not limited thereto.

Here, as the functional catalyst, those which contain a functional catalyst selected from the group consisting of a denitrification catalyst, a sulfurization catalyst, a dioxins decomposition catalyst, and an ammonia decomposition catalyst.

Among these functional catalysts, as the denitrification catalyst, for example, a denitrification catalyst described in JP-A-2008-155133 of the present applicant can be used. This denitrification catalyst-containing slurry contains a silica sol (Si) as a binder component, and titanium (Ti)-vanadium (V)-tungsten (W) as a denitrification catalyst metal.

As the ammonia decomposition catalyst, an ammonia decomposition catalyst described in JP-A-2011-78888 of the present applicant can be used. The ammonia decomposition catalyst contains Ruthenium (Ru) as an ammonia decomposition catalyst metal and a promotor, and a silica sol (Si) is incorporated in the ammonia decomposition catalyst such that this catalyst can be used as the functional catalyst in the present invention.

For example, a denitrification catalyst-containing slurry is obtained by adding ammonium metavanadate to a slurry in which titania fine particles are suspended in a silica sol to allow titania to adsorb ammonium metavanadate, and further adding ammonium metatungstate or a solution thereof. The denitrification catalyst-containing slurry is then applied on a flat glass paper and dried to allow the glass paper to support titania, vanadium oxide and ammonium metatungstate simultaneously thereon. This procedure can simultaneously achieve titania support, vanadium support and tungsten support in one step, and therefore single operation are merely required each for the application, drying and burning, that is, the number of steps is small, whereby enhancement of the productivity and reduction in the cost can be achieved.

In the step of applying the slurry containing functional catalyst such as a denitrification catalyst on the flat glass paper and drying the glass paper to allow the glass paper to support the functional catalyst thereon, as an application method, any application method, such as, for example, a so-called dipping method, a brush application method, a spray application method, and a drip application method may be adopted.

Next, it is preferred that the method for producing the treatment device (10) equipped with a catalyst-supporting honeycomb structure according to the present invention comprises the step of further baking the inorganic binder-containing functional catalyst-supporting corrugated glass paper (2) and the inorganic binder-containing functional catalyst-supporting flat glass paper (3) which are released from the respective molds, thereby thermally decomposing and removing an organic binder originally contained in the glass paper, while holding the shape of the glass paper by the inorganic binder, to thereby form an inorganic binder-containing functional catalyst-supporting corrugated glass paper (2) and an inorganic binder-containing functional catalyst-supporting flat glass paper (3).

In the step of baking the inorganic binder-containing functional catalyst-supporting corrugated glass paper (2) and the inorganic binder-containing functional catalyst-supporting flat glass paper (3) which have been made to the state of a honeycomb structure, the baking is preferably performed under conditions of 400 to 550° C. and for 2 to 4 hours.

Here, the inorganic binder-containing functional catalyst-supporting corrugated glass paper (2) and the inorganic binder-containing functional catalyst-supporting flat glass paper (3) are baked in the state where the glass paper sheets are alternately stacked. In this step, if sheets of the inorganic binder-containing functional catalyst-supporting corrugated glass paper (2) only or sheets of the inorganic binder-containing functional catalyst-supporting flat glass paper (3) only are stacked and the respective stacks are baked separately, it seems effective for baking due to a smaller bulk. However, there arises a problem in that uniform baking cannot be achieved. Spaces between combinations of the inorganic binder-containing functional catalyst-supporting corrugated glass paper (2)+the inorganic binder-containing functional catalyst-supporting flat glass paper (3) are important for the atmosphere of the baking, and uniform baking can be achieved owing to the spaces.

Through the baking as described above, the organic binder originally contained in the glass paper is thermally decomposed and removed in advance, the shape of the glass paper is thereby securely held by the inorganic binder, and the inorganic binder-containing functional catalyst-supporting corrugated glass paper (2) and the inorganic binder-containing functional catalyst-supporting flat glass paper (3) can be securely formed, so such a baking is preferred.

In the method for producing the treatment device (10) equipped with a catalyst-supporting honeycomb structure according to the present invention, it is preferred that in the step of packing into the casing (4), the inorganic binder-containing functional catalyst-supporting corrugated glass paper (2) and the inorganic binder-containing functional catalyst-supporting flat glass paper (3) are alternately stacked without being bonded to each other.

Accordingly, for example, in an exhaust gas purification treatment or the like, even if cells of the catalyst-supporting honeycomb structure are clogged with solids in gas to be treated as the operating time elapses, since the inorganic binder-containing functional catalyst-supporting corrugated glass paper (2) and the inorganic binder-containing functional catalyst-supporting flat glass paper (3) are alternately stacked without being bonded to form the catalyst-supporting honeycomb structure (1) and this catalyst-supporting honeycomb structure (1) is packed in the casing (4), this honeycomb structure (1) can be disassembled and removed out of the casing (4), and the removed catalyst-supporting corrugated glass paper (2) and catalyst-supporting flat glass paper (3) can be easily treated for regeneration, for example, by cleaning the glass papers, whereby a decrease of the contact area of gas to be treated and an increase of the pressure loss can be securely prevented.

In the step of packing the catalyst-supporting honeycomb structure (1) in the method of producing the treatment device (10) of the present invention, it is preferred that the casing (4) is a casing including the casing main body (4a) having a substantially U-shape cross section and the flat lid (4b) which covers the opening of the casing main body, a casing, whose drawing is however omitted, having a substantially square shape cross section, or a casing including a casing main body having a substantially L-shape cross section and a lid having a substantially laid L-shape cross section which faces and fits with the casing main body.

The inorganic binder-containing functional catalyst-supporting flat glass paper (3) and the inorganic binder-containing functional catalyst-supporting corrugated glass paper (2) are alternately stacked without being bonded to form the catalyst-supporting honeycomb structure (1), and this catalyst-supporting honeycomb structure (1) is packed in the casing main body (4a) having a substantially U-shape cross section made of, for example, a stainless steel. Then, the flat lid (4b) made of a stainless steel is fitted over the opening of the casing main body (4a), and welding is performed.

Incidentally, in place of the welding, it is possible that one edges of the casing main body (4a) and the lid (4b) are joined to each other, for example, with a slip-joint hinge structure, and by inserting and pulling out a pin to be placed in the center of the slip-joint hinge structure, the casing main body (4a) and the lid (4b) are fitted with each other. By fastening the casing main body (4a) and the lid (4b) with the slip-joint hinge, even when cells of the catalyst-supporting honeycomb structure (1) are clogged with solids in gas to be treated, the honeycomb structure (1) can be treated for regeneration more easily and more quickly, so it is preferred.

Alternatively, the inorganic binder-containing functional catalyst-supporting flat glass paper (3) and the inorganic binder-containing functional catalyst-supporting corrugated glass paper (2) are alternately stacked without being bonded to form the catalyst-supporting honeycomb structure (1), and this catalyst-supporting honeycomb structure (1) is packed in a casing having a substantially square cross section, for example, made of a stainless steel.

Alternatively, the catalyst-supporting honeycomb structure (1) is packed in a casing main body having a substantially L-shape cross section, for example, made of a stainless steel. Then, a lid having a substantially laid L-shape cross section made of a stainless steel is fitted with the casing main body so as to face the casing main body, and the welding is performed.

In the step of packing the catalyst-supporting honeycomb structure (1) in the method for producing the treatment device (10) equipped with a catalyst-supporting honeycomb structure of the present invention, it is preferred that the inorganic fiber blanket (5) is placed over the inner surface of the casing (4) before the catalyst-supporting honeycomb structure (1) is packed.

By placing the inorganic fiber blanket (5) over the inner surface of the casing (4), a vibration measure can be implemented by a friction force between the catalyst-supporting honeycomb structure (1) and the inorganic fiber blanket (5).

Here, in the step of placing the inorganic fiber blanket (5) over the inner surface of the casing (4) and alternately stacking the functional catalyst-supporting flat glass paper (3) and the functional catalyst-supporting corrugated glass paper (2) without being bonded, on the inorganic fiber blanket (5) in the bottom portion of the casing (4), that is, as the lowermost layer, the functional catalyst-supporting flat glass paper (3) is preferably packed. The functional catalyst-supporting corrugated glass paper (2) and the functional catalyst-supporting flat glass paper (3) are then sequentially alternately stacked. As the uppermost layer, in turn, the functional catalyst-supporting flat glass paper (3) is preferably packed. That is, the sheet number of the flat glass paper (3) packed in the casing (4) is one larger than the sheet number of the corrugated glass paper (2).

Also on the inner surfaces of the right and left sides of the casing (4), it is preferred that the inorganic fiber blanket (5) is interposed between the inner surface of the casing (4) and the catalyst-supporting honeycomb structure (1).

Thus, a vibration measure can be implemented by a friction force between the catalyst-supporting honeycomb structure (1) and the inorganic fiber blanket (5) on the inner surfaces of the casing (4).

When the place where the treatment device (10) equipped with a catalyst-supporting honeycomb structure according to the present invention is arranged exhibits a strong vibration, the inorganic fiber blanket (5) may be placed over the inner surface of the casing (4), and when any vibration measure is not particularly required, the inorganic fiber blanket (5) may not be placed.

EXAMPLES

Examples of the present invention will be hereinunder explained, but the present invention is not to be limited to the examples.

Example 1

A denitrification catalyst-supporting honeycomb-type treatment device was produced according to the method of the present invention as follows.

The method for producing a treatment device equipped with a catalyst-supporting honeycomb structure of the present invention, shown in FIG. 3, was performed in order of the steps.

Firstly, on a flat glass paper (20×30 cm) having a fiver level of 100 g/m$^2$ and containing 10% by weight of an acrylic resin organic binder, as a commercially available glass paper, an inorganic binder-mixed functional catalyst-containing slurry was applied in an amount of 1333 g/m$^2$.

As the functional catalyst, a denitrification catalyst was used. Specifically, ammonium metavanadate powder was added to a slurry obtained by suspending titania fine particles in a silica sol, the whole mixture was stirred to allow titania to adsorb ammonia metavanadate. A silica sol was used as an inorganic binder, the content of the silica sol in the silica sol-mixed denitrification catalyst-containing slurry was 15% by weight.

Next, a corrugation mold (20×20 cm), which is formed of a corrugated panel made of a stainless steel and having parallel recessed grooves with a width of 10.4 mm, a height of 7.4 mm, and a radius of curvature at the groove bottom of 1.6 mm, was placed on a hot plate, and the mold was heated to a surface temperature of 300° C. The flat glass paper having the silica sol-mixed denitrification catalyst-containing slurry applied thereon was placed on the mold, and the glass paper was shaped by pressing it with a presser jig along the recessed grooves in the mold, while moisture in the slurry on the surface of the glass paper was removed to dry the glass paper, whereby a silica sol-containing denitrification catalyst-supporting corrugated glass paper (2) was formed, and the silica sol-containing denitrification catalyst-supporting corrugated glass paper (2) was released from the corrugation mold while holding the shape.

On the other hand, a mold (20×20 cm) formed of a flat panel made of a stainless steel was placed on a hot plate, and the mold was heated to a surface temperature of 300° C. The flat glass paper having the silica sol-mixed denitrification catalyst-containing slurry applied thereon was placed and heated on the mold, and thus moisture in the slurry on the surface of the glass paper was removed to dry the glass paper, whereby a silica sol-containing denitrification catalyst-supporting flat glass paper (3) was formed, and the silica sol-containing denitrification catalyst-supporting flat glass paper (3) was released from the flat mold while holding the shape.

In this example, 26 sheets of the silica sol-containing denitrification catalyst-supporting corrugated glass paper (2) and 27 sheets of the silica sol containing denitrification catalyst-supporting flat glass paper (3) which were released from the molds were used and alternately stacked without being bonded, and further baked at 500° C. for 3 hours, whereby the denitrification catalyst-supporting honeycomb structure (1) was formed. An organic binder component contained in the glass paper was removed in this baking step.

Next, a square tube casing (4) including a casing main body (4a) which is made of a stainless steel and has a substantially U-shape cross section and a flat lid (4b) made of a stainless steel which covers the opening of the casing main body was provided, a blanket (5) made of ceramic fiber was placed inside the casing main body (4a), and then the denitrification catalyst-supporting honeycomb structure (1) in which the silica sol-containing denitrification catalyst-supporting flat glass paper (3) and the silica sol-containing denitrification catalyst-supporting corrugated glass paper (2) were alternately stacked without being bonded was packed in the casing main body (4), whereby a treatment device (10) equipped with a denitrification catalyst-supporting honeycomb structure according to the present invention was produced.

According to the treatment device (10) equipped with a catalyst-supporting honeycomb structure of Example 1 of the present invention, the treatment device (10) equipped with the denitrification catalyst-supporting honeycomb structure (1) can be produced using a commercially available inexpensive glass paper as a substrate. In addition to that, large facilities such as an immersion tank, a drying apparatus or the like for a so-called bonding-type honeycomb structure in the prior art are not required and the production cost is reduced.

Furthermore, even when cells of the catalyst-supporting honeycomb structure (1) are clogged with solids in gas to be treated as the operating time elapses, for example, in an exhaust gas purification treatment or the like, since the denitrification catalyst-supporting corrugated glass paper (2)

and the denitrification catalyst-supporting flat glass paper (3) are alternately stacked without being bonded to form the catalyst-supporting honeycomb structure (1), and this catalyst-supporting honeycomb structure (1) is packed in the casing (4), the honeycomb structure (1) can be disassembled and removed out of the casing (4), and the removed denitrification catalyst-supporting corrugated glass paper (2) and denitrification catalyst-supporting flat glass paper (3) can be easily treated for regeneration, for example, by cleaning the glass papers, whereby a decrease of the contact area of the gas to be treated and an increase of the pressure loss can be securely prevented.

Incidentally, in this Example 1, the silica sol-containing denitrification catalyst-supporting corrugated glass paper (2) and the silica sol-containing denitrification catalyst-supporting flat glass paper (3) which are released from the molds are alternately stacked without being bonded, and further baked to remove the organic binder component contained in the glass paper, and then the obtained catalyst-supporting honeycomb structure (1) is packed in the casing (4). However, it is possible that, without performing the baking step, the silica sol-containing denitrification catalyst-supporting corrugated glass paper (2) and the silica sol-containing denitrification catalyst-supporting flat glass paper (3) released from the molds are alternately stacked without being bonded to form the denitrification catalyst-supporting honeycomb structure (1), and this catalyst-supporting honeycomb structure (1), as it is, is packed in the casing (4).

In this case, when the treatment device (10) equipped with the catalyst-supporting honeycomb structure (1) produced is incorporated, for example, in a denitrification device and denitrification of exhaust gas is conducted at a temperature of 250 to 400° C., the organic binder originally contained in the glass paper is thermally decomposed gradually and removed, and naturally, the corrugated shape of the glass paper is, also in this case, held by the silica sol which is an inorganic binder, so there is no problem.

Example 2

A treatment device (10) equipped with a denitrification catalyst-supporting honeycomb structure (1) was produced according to the method of the present invention in the same manner as in Example 1 above, but there was a difference from Example 1 in that each mold was heated to a surface temperature of 250° C. and used. The treatment device (10) equipped with the denitrification catalyst-supporting honeycomb structure (1) according to the present invention was produced in the same manner as in Example 1 except for the surface temperature of the molds.

Example 3

A treatment device (10) equipped with a denitrification catalyst-supporting honeycomb structure (1) was produced according to the method of the present invention in the same manner as in Example 1 above, but there was a difference from Example 1 in that each mold was heated to a surface temperature of 200° C. and used. The treatment device (10) equipped with the denitrification catalyst-supporting honeycomb structure (1) according to the present invention was produced in the same manner as in Example 1 except for the surface temperature of the molds.

Reference Example 1

In the method for producing a treatment device equipped with a catalyst-supporting honeycomb structure in Example 1 above, each mold was heated to a surface temperature of 100° C. and used to produce a treatment device equipped with a catalyst-supporting honeycomb structure.

Comparative Example 1

For comparison, in the method for producing a treatment device equipped with a catalyst-supporting honeycomb structure in Example 1 above, each mold was used at a normal temperature without heating to produce a treatment device equipped with a catalyst-supporting honeycomb structure.

Comparison of Examples 1 to 3, Reference Example 1, and Comparative Example 1

Next, with respect to Examples 1 to 3 according to the present invention, Reference Example 1, and Comparative Example 1, after corrugation at each surface temperature (° C.) of the corrugation mold in the corrugation step of the silica sol-mixed denitrification catalyst-containing slurry-applied flat glass paper, a releasing time (sec) of the corrugated glass paper from the mold was measured. The results were compared, and the corrugated shape of each corrugated glass paper after corrugation was evaluated whether it was good or bad. The results are collectively shown in Table 1.

TABLE 1

| | Mold temperature (° C.) | Time required for releasing (sec) | Good or bad of corrugated shape |
|---|---|---|---|
| Example 1 | 300 | 3 | ○ |
| Example 2 | 250 | 90 | ○ |
| Example 3 | 200 | 300 | ○ |
| Reference Example 1 | 100 | 3000 | Δ |
| Comparative Example 1 | Normal temperature | — | X |

As is apparent from Table 1 above, in all of Examples 1 to 3 according to the present invention, the silica sol-mixed denitrification catalyst-containing slurry-applied flat glass paper could be clearly corrugated. Further, when the surface temperature of the corrugation mold was changed from 200 to 300° C., the drying time required until the silica sol-containing denitrification catalyst-supporting corrugated glass paper (2) was released from the mold was changed. Incidentally, the time required for releasing is an approximate time required, when the mold is lifted up at a tilt, for the silica sol-containing denitrification catalyst-supporting corrugated glass paper (2) shaped into a corrugated shape to naturally slide off the mold. In contrast, in the case of the surface temperature of the corrugation mold being 100° C. in Reference Example 1, the efficiency of the drying was worse and the corrugation could not be achieved well. Furthermore, in the case of the surface temperature of the corrugation mold being a normal temperature in Comparative Example 1, it was impossible to achieve the corrugation of the silica sol-mixed denitrification catalyst-containing slurry-applied flat glass paper on the mold.

The invention claimed is:

1. A method for producing a treatment device equipped with a catalyst-supporting honeycomb structure, which is characterized in that the method comprises the steps of:
  applying a functional catalyst-containing slurry having an inorganic binder mixed therein on a flat glass paper;
  placing and heating the slurry-applied flat glass paper on a corrugation mold of a high temperature, while shaping the glass paper with a presser jig and removing moisture in the slurry on the surface of the glass paper to dry the glass paper, thereby forming an inorganic binder-containing functional catalyst-supporting corrugated glass paper;

releasing the inorganic binder-containing functional catalyst-supporting corrugated glass paper from the corrugation mold while holding the shape;

meanwhile, placing and heating the slurry-applied flat glass paper on a flat mold of a high temperature to remove moisture in the slurry on the surface of the glass paper and dry the glass paper, thereby forming an inorganic binder-containing functional catalyst-supporting flat glass paper;

releasing the inorganic binder-containing functional catalyst-supporting flat glass paper from the flat mold while holding the shape; and alternately stacking the inorganic binder-containing functional catalyst-supporting corrugated glass paper and the inorganic binder-containing functional catalyst-supporting flat glass paper and packing the stack in a casing.

2. The method for producing a treatment device equipped with a catalyst-supporting honeycomb structure according to claim 1, which is characterized in that the surface temperatures of the corrugation mold and the flat mold are within the range of from 200 to 500° C.

3. The method for producing a treatment device equipped with a catalyst-supporting honeycomb structure according to claim 2, which is characterized in that the inorganic binder contains at least one inorganic oxide selected from the group consisting of a silica sol, an alumina sol, a γ-alumina, a titanium oxide sol, and a zirconia sol.

4. The method for producing a treatment device equipped with a catalyst-supporting honeycomb structure according to claim 2, which is characterized in that the method comprises the step of: further baking the inorganic binder-containing functional catalyst-supporting corrugated glass paper and the inorganic binder-containing functional catalyst-supporting flat glass paper released from the respective molds to thermally decompose and remove an organic binder originally contained in the glass papers, while holding the shapes of the glass papers by the inorganic binder, to thereby form an inorganic binder-containing functional catalyst-supporting corrugated glass paper and an inorganic binder-containing functional catalyst-supporting flat glass paper.

5. The method for producing a treatment device equipped with a catalyst-supporting honeycomb structure according to claim 2, which is characterized in that, in the step of packing in the casing, the inorganic binder-containing functional catalyst-supporting corrugated glass paper and the inorganic binder-containing functional catalyst-supporting flat glass paper are alternately stacked without being bonded to each other.

6. The method for producing a treatment device equipped with a catalyst-supporting honeycomb structure according to claim 1, which is characterized in that the inorganic binder contains at least one inorganic oxide selected from the group consisting of a silica sol, an alumina sol, a γ-alumina, a titanium oxide sol, and a zirconia sol.

7. The method for producing a treatment device equipped with a catalyst-supporting honeycomb structure according to claim 6, which is characterized in that the method comprises the step of: further baking the inorganic binder-containing functional catalyst-supporting corrugated glass paper and the inorganic binder-containing functional catalyst-supporting flat glass paper released from the respective molds to thermally decompose and remove an organic binder originally contained in the glass papers, while holding the shapes of the glass papers by the inorganic binder, to thereby form an inorganic binder-containing functional catalyst-supporting corrugated glass paper and an inorganic binder-containing functional catalyst-supporting flat glass paper.

8. The method for producing a treatment device equipped with a catalyst-supporting honeycomb structure according to claim 1, which is characterized in that the method comprises the step of: further baking the inorganic binder-containing functional catalyst-supporting corrugated glass paper and the inorganic binder-containing functional catalyst-supporting flat glass paper released from the respective molds to thermally decompose and remove an organic binder originally contained in the glass papers, while holding the shapes of the glass papers by the inorganic binder, to thereby form an inorganic binder-containing functional catalyst-supporting corrugated glass paper and an inorganic binder-containing functional catalyst-supporting flat glass paper.

9. The method for producing a treatment device equipped with a catalyst-supporting honeycomb structure according to claim 1, which is characterized in that, in the step of packing in the casing, the inorganic binder-containing functional catalyst-supporting corrugated glass paper and the inorganic binder-containing functional catalyst-supporting flat glass paper are alternately stacked without being bonded to each other.

* * * * *